Aug. 4, 1936.  G. BAUER  2,049,412
METHOD AND APPARATUS FOR CUTTING PHENOLIC RESIN
Filed May 27, 1935  2 Sheets-Sheet 1
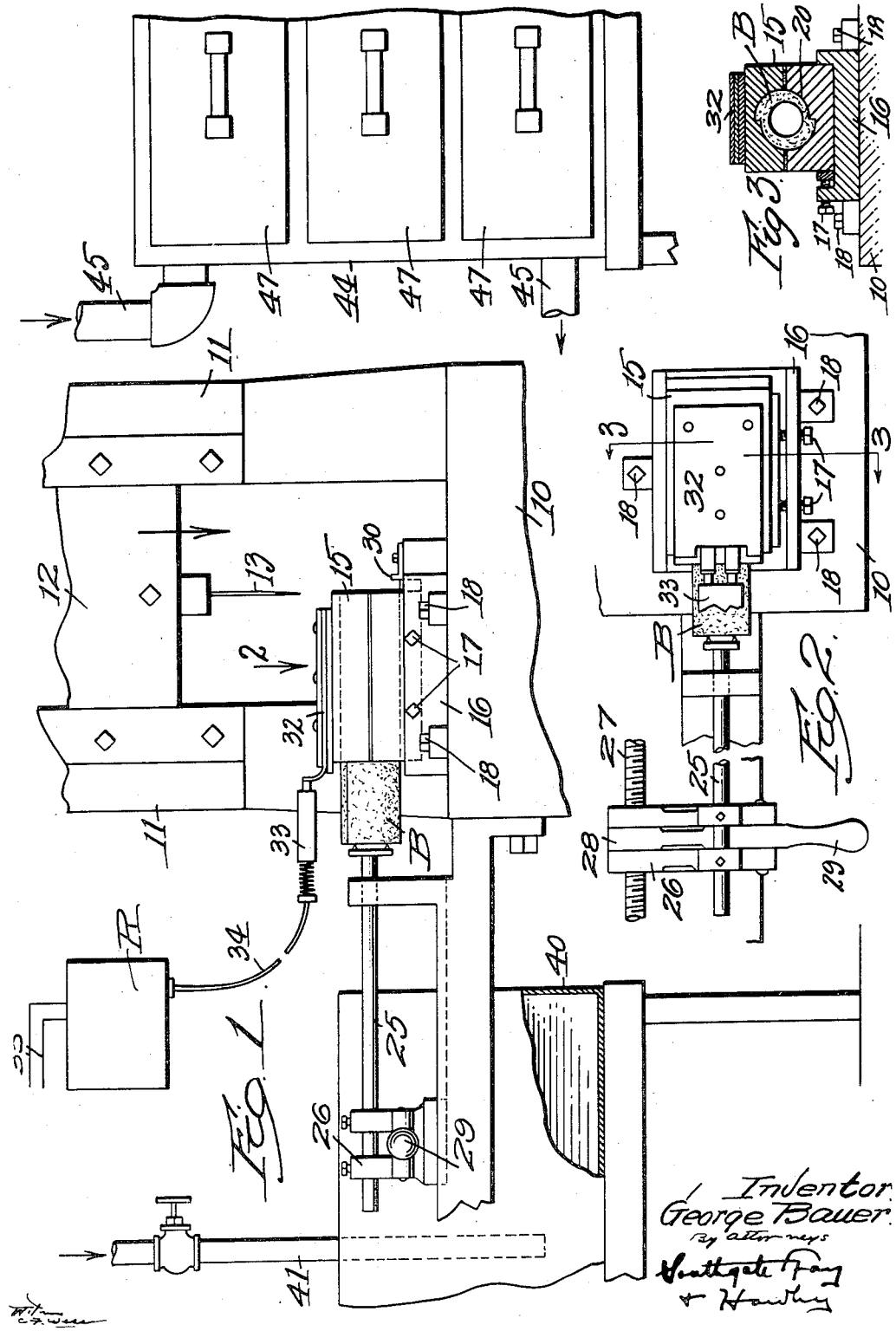
Inventor
George Bauer
By attorneys

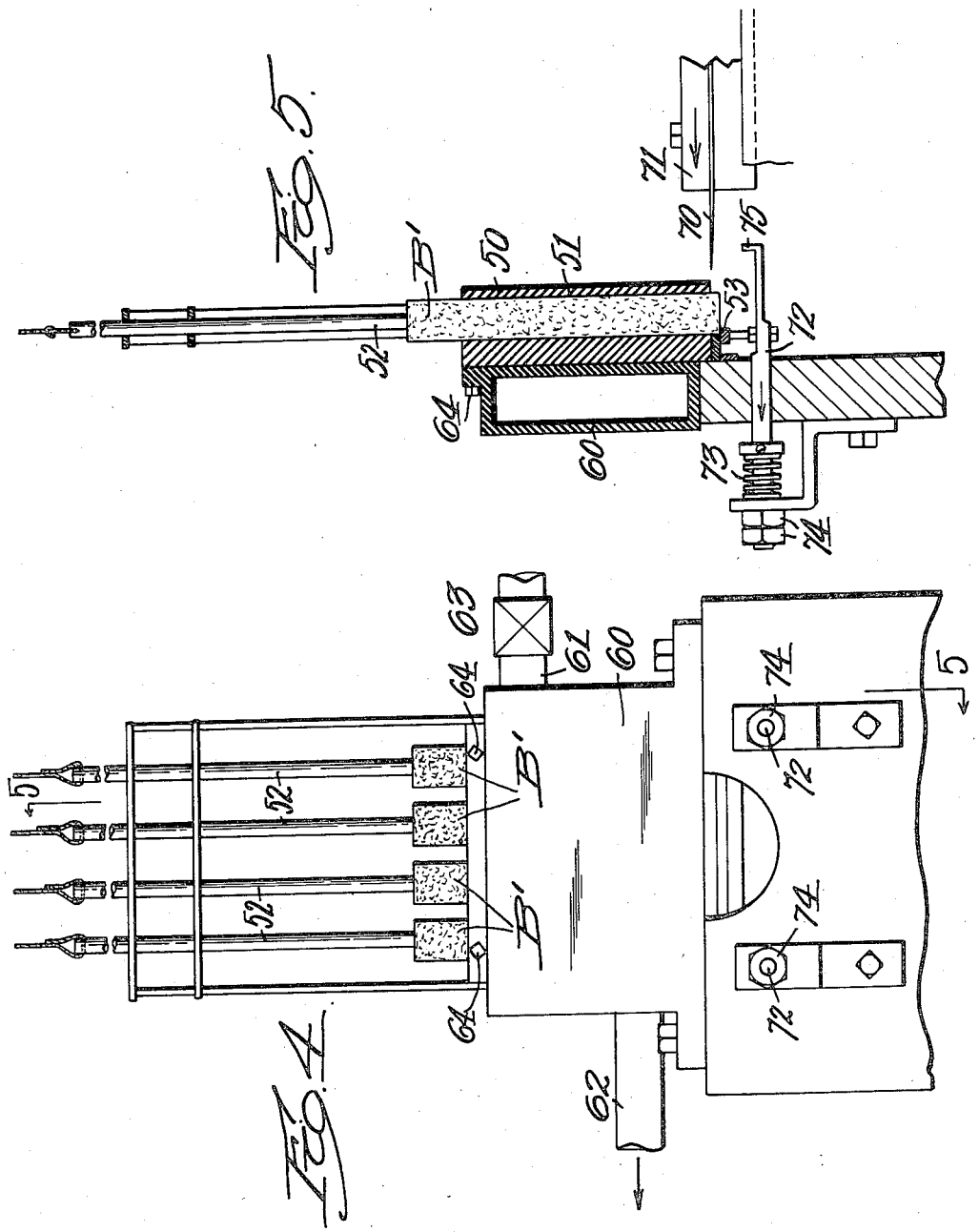

Patented Aug. 4, 1936

2,049,412

UNITED STATES PATENT OFFICE 2,049,412

METHOD AND APPARATUS FOR CUTTING PHENOLIC RESIN

George Bauer, Leominster, Mass., assignor to New England Novelty Company, Leominster, Mass., a corporation of Massachusetts Application May 27, 1935, Serial No. 23,599

2 Claims. (Cl. 18—1)

This invention relates to a method and apparatus for cutting discs or blanks from bars of phenolic resin.

In the manufacture of buttons, buckles and similar articles from this material, it is customary to provide bars of the material having a cross section corresponding to the shape of the article to be produced, and frequently having passages therethrough corresponding to openings in the article. These bars and passages are often of substantial dimensions. Discs or blanks of the desired thickness are then cut from the ends of these bars, after which the parts are subjected to the usual finishing and polishing operations.

The cutting of such blanks from bars of phenolic resin has been a matter of considerable difficulty, as this material in its normal condition cannot be shaved or sliced without excessive breakage. The usual commercial method of forming these discs or blanks from this material has been to cut the material by a grinding operation, using a very thin disc wheel. This procedure is relatively slow and expensive and the wheels are frequently broken.

It is the general object of my invention to provide an improved method of cutting blanks from phenolic resin bars and also to provide improved apparatus to be used in connection with my improved method.

My invention further relates to arrangements and combinations of parts which will be hereinafter described and more particularly pointed out in the appended claims.

Preferred forms of my improved apparatus are shown in the drawings, in which

Fig. 1 is a partial front elevation, partly in section, of one form of apparatus which may be used in practicing my improved method;

Fig. 2 is a partial plan view, looking in the direction of the arrow 2 in Fig. 1;

Fig. 3 is a sectional elevation, taken along the line 3—3 in Fig. 2;

Fig. 4 is a partial front elevation of a different form of apparatus which may be used in practicing my invention, and Fig. 5 is a sectional elevation, taken along the line 5—5 in Fig. 4.

Referring to Figs. 1 to 3, I have shown portions of a press of commercial construction, comprising a bed 10 and posts or standards 11 providing guideways for a head 12, to which a relatively wide and flat slicing knife 13 may be firmly secured. The head 12 is reciprocated by the usual actuating mechanism found in such presses, and the cutting movements of the head are controlled through the usual stopping and starting devices.

A work holder 15 is secured in a stand 16 by clamping screws 17 and the stand 16 is in turn secured to the bed 10 by clamping bolts 18.

The holder 15 is usually rectangular in cross section, as shown in Fig. 3, and is provided with an opening or passage 20 therethrough of a cross section corresponding to the cross section of the bar B from which the discs are to be cut, the bar being an easy sliding fit in the holder.

The bars B are of many different shapes and sizes and a separate holder 15 is preferably provided for each shape and size of bar to be sliced in the machine.

Any usual automatic or manual feeding device may be provided for intermittently advancing the bar B through the holder 15. In the drawings I have shown a feed bar 25 secured to a sliding carrier 26 having openings through which a feed screw 27 extends freely.

A lever 28 has a threaded under surface constituting a half-nut which normally engages the screw 27. The screw 27 is intermittently rotated during each idle stroke of the head 12, thus feeding the bar B a predetermined distance through the holder 15.

By depressing the handle portion 29 of the lever 28, the half-nut is freed from the screw 27 and the feed rod may be manually withdrawn. Also while the handle is depressed, the feed rod may be used to push or feed the bar B manually through the holder 15 and against a stop 30 (Fig. 1) if so desired.

A heating unit 32 is secured to the top of the holder 15 and in close contact therewith. The terminals of this heating unit are connected through a removable attachment 33 and wire connections 34 to a rheostat R and line wires 35.

At a point conveniently adjacent the press, I provide a tank 40 which may be filled with hot water or oil and which has a steam pipe 41 by which a desired high temperature may be maintained. I may also provide adjacent the press a steam-heated oven 44 having pipes 45 for the circulation of steam therethrough and provided with one or more drawers 47 adapted to receive bars B.

Having described this form of apparatus, I will now explain the method by which I form discs or blanks from the bars B. The rheostat R is set to provide the desired degree of heat in the heating unit 32, the operator determining the temperature by consideration of the size and shape of the bar to be sliced, as well as the specific material.

Heat from the heating unit raises the temperature of the holder 15 to the desired temperature and maintains this relatively high temperature during the slicing operations.

The bars B are placed either in the heating tank 40 or in one of the oven drawers 47 and are left therein long enough to become thoroughly heated through, a period which varies substantially with the kind, size and cross section of the bars.

A heated bar is then removed from the bath or oven and is placed in the holder 15, where its temperature will be maintained by the heating unit 32. The automatic feeding device, if used, is then brought up against the back end of the bar and the machine is set in operation to slice successive discs or blanks from the end of the bar and to automatically advance the bar in the heated holder 15 after each blank is cut.

In this way the temperature of the bar is maintained at the desired high point throughout the cutting of the entire bar. This temperature is selected so that the bar will be soft enough to cut without breaking, while at the same time it remains hard enough to resist distortion, particularly when cutting bars having interior passages.

The slicing operation may thus be performed much more rapidly than the previous method of cutting by a thin grinding disc, the ratio of production being about five to one and the expense of the blank-forming operation being correspondingly reduced.

A very great saving in expensive material is also effected, as no material is wasted between blanks by my method, while sawing or grinding wastes fifteen percent to twenty-five percent of the stock in the cuts.

Obviously instead of using the automatic feed, the bar may be pushed forward against a stop 30, after each slicing operation.

In Figs. 4 and 5, I have shown a modified construction in which a plurality of bars B' are fed vertically through a holder 50 having a series of openings 51 therethrough. A weight rod 52 rests on the top of each bar B' and automatically feeds the bar downward against a stop 53 as often as a blank is removed from the lower end of the bar.

A steam chest 60 receives steam through a pipe 61 and this steam is discharged through a pipe 62, thus maintaining a relatively high temperature in the steam chest 60. An automatic thermostatic valve 63 may be provided to control the circulation if desired.

The holder 50 is secured to the steam chest 60 in any convenient manner, as by screws 64, and is thus heated to the desired high temperature. A knife 70 is mounted in a sliding head or carrier 71 which is intermittently reciprocated under the holder 50 to sever successive discs or blanks from the lower ends of the bars B', several blanks being thus formed at each stroke of the knife.

With this machine, the ratio of production may be 20 to 1 or higher, as compared with grinding.

The stop 53 is mounted on a sliding support 72 yieldingly held in operative position by a spring 73, the position of the stop being determined by lock nuts 74. A projection 75 on the support 72 is engaged by the carrier 71 when the blank is partially severed, and the stop is thus removed to permit the blank to drop when the stroke of the knife is completed. As the return stroke begins, the stop 53 returns to operative position and again engages the bar B' as it is fed downward by its weight rod 52.

A hot bath 40 or an oven 44 will be provided adjacent the machine shown in Figs. 4 and 5, in the same manner as previously described, and I am able to carry out my improved method by the use of either form of apparatus. The first form is better adapted to special shapes and odd sizes, while the second machine is preferably used for the more regular sizes and shapes and for quantity production.

The essential feature of my invention relates to the preheating of the bars of phenolic resin to a desired temperature and to the maintenance of a relatively high and uniform temperature for the bar throughout the subsequent cutting of the bar into blanks or discs. The material on which I operate is commercial phenolic resin, fully hardened and seasoned and taken from storage for use.

Having thus described my invention and the advantages thereof, I do not wish to be limited to the details herein disclosed, otherwise than as set forth in the claims, but what I claim is:—

1. The method of slicing phenolic resin which comprises treating it to make a bar or block uniform in cross section and soft enough to be sheared, but still hard enough to resist distortion, said treatment including heating, encasing the bar or block closely but with a sliding fit, extruding successive portions of the bar or block while maintaining it at substantially the same temperature as while it is encased, and successively shearing off the extruded portions while they remain at substantially the same temperature.

2. Apparatus for slicing a bar or block of phenolic resin of uniform cross section which comprises means for holding it with a close, sliding fit, a plunger for extruding it from the holding means, means for maintaining the bar or block at a temperature sufficient to keep it soft enough to cut but hard enough to resist distortion and means shearing across the end of the holder for cutting the resin into slices.

GEORGE BAUER.